(12) United States Patent
Liao et al.

(10) Patent No.: US 8,855,044 B2
(45) Date of Patent: Oct. 7, 2014

(54) TWO-STEP UPLINK SYNCHRONIZATION FOR PICO/FEMTOCELL

(75) Inventors: Pei-Kai Liao, Mingjian Xiang (TW);
Yih-Shen Chen, Hsinchu (TW);
Kuhn-Chang Lin, Chiayi (TW); York Ted Su, Chia-Yi (TW)

(73) Assignee: Mediatek Inc. (TW)

( * ) Notice: Subject to any disclaimer, the term of this patent is extended or adjusted under 35 U.S.C. 154(b) by 93 days.

(21) Appl. No.: 12/930,453

(22) Filed: Jan. 7, 2011

(65) Prior Publication Data

US 2011/0171949 A1 Jul. 14, 2011

Related U.S. Application Data

(60) Provisional application No. 61/293,424, filed on Jan. 8, 2010.

(51) Int. Cl.
| | | |
|---|---|---|
| H04B 7/212 | (2006.01) | |
| H04J 3/06 | (2006.01) | |
| H04W 56/00 | (2009.01) | |
| H04W 48/16 | (2009.01) | |
| H04W 48/08 | (2009.01) | |
| H04W 84/04 | (2009.01) | |
| H04W 28/04 | (2009.01) | |

(52) U.S. Cl.
CPC .......... *H04W 56/0045* (2013.01); *H04W 48/16* (2013.01); *H04W 48/08* (2013.01); *H04W 84/045* (2013.01); *H04W 28/04* (2013.01)
USPC ............ 370/324; 370/350; 370/328; 370/503

(58) Field of Classification Search
USPC ................................. 370/324, 328
See application file for complete search history.

(56) References Cited

U.S. PATENT DOCUMENTS

| 6,633,559 B1 | 10/2003 | Asokan et al. ................. 370/350 |
| 2006/0029031 A1 | 2/2006 | Koorapaty ..................... 370/350 |

(Continued)

FOREIGN PATENT DOCUMENTS

| CN | 1378761 A | 8/1999 |
| CN | 1522077 A | 2/2003 |

(Continued)

OTHER PUBLICATIONS

International Search Report and Written Opinion of International Search Authority for PCT/CN2011/070103 dated Apr. 21, 2011(10 pages).

(Continued)

Primary Examiner — Noel Beharry
Assistant Examiner — Joe Combs
(74) Attorney, Agent, or Firm — Zheng Jin; Helen Mao

(57) ABSTRACT

A two-step uplink synchronization method is provided for uplink synchronization between a mobile station and a pico/femto base station that is deployed together with an overlay macro/micro base station. In a first step, the pico/femto BS encodes and broadcasts UL transmission timing advance offset information via a broadcast channel. The MS decodes the received UL transmission timing advance offset information and advances its uplink timing for uplink ranging or reference signal transmission based on the decoded offset value. In a second step, the MS and the pico/femto BS performs regular uplink synchronization and uplink access. In one example, the UL transmission timing advance offset information indicates a round-trip propagation time of radio signals between the pico/femto base station and the overlay macro/micro base station. By using the two-step uplink synchronization method, a unified synchronous ranging channel may be used for ranging and UL access in pico/femtocells with reduced interference.

22 Claims, 6 Drawing Sheets

METHOD OF TWO-STEP UPLINK
SYNCHRONIZATION FOR PICO/FEMTOCELLS

(56) References Cited

U.S. PATENT DOCUMENTS

| | | | |
|---|---|---|---|
| 2006/0165032 A1 | 7/2006 | Hamalainen et al. | 370/328 |
| 2007/0149206 A1* | 6/2007 | Wang et al. | 455/450 |
| 2008/0285670 A1* | 11/2008 | Walton et al. | 375/260 |
| 2008/0305804 A1* | 12/2008 | Lee et al. | 455/446 |
| 2008/0310321 A1* | 12/2008 | Grilli et al. | 370/252 |
| 2009/0097452 A1* | 4/2009 | Gogic | 370/331 |
| 2009/0180443 A1 | 7/2009 | Kawasaki et al. | 370/331 |
| 2009/0247156 A1* | 10/2009 | Sampath et al. | 455/434 |
| 2009/0290555 A1* | 11/2009 | Alpert et al. | 370/331 |
| 2009/0291686 A1* | 11/2009 | Alpert et al. | 455/436 |
| 2009/0310556 A1* | 12/2009 | Ishii et al. | 370/329 |
| 2009/0318175 A1* | 12/2009 | Sandberg | 455/502 |
| 2010/0034141 A1* | 2/2010 | Meylan | 370/328 |
| 2010/0111047 A1* | 5/2010 | Yang et al. | 370/336 |
| 2010/0111070 A1* | 5/2010 | Hsu | 370/350 |
| 2010/0128617 A1* | 5/2010 | Aggarwal et al. | 370/252 |
| 2010/0130212 A1* | 5/2010 | So et al. | 455/444 |
| 2010/0150109 A1* | 6/2010 | Bradley et al. | 370/331 |
| 2010/0157820 A1* | 6/2010 | Cheng et al. | 370/252 |
| 2010/0157906 A1* | 6/2010 | Yang et al. | 370/328 |
| 2010/0203891 A1* | 8/2010 | Nagaraja et al. | 455/436 |
| 2010/0220597 A1* | 9/2010 | Ji et al. | 370/241 |
| 2010/0220621 A1* | 9/2010 | Li et al. | 370/252 |
| 2010/0222068 A1* | 9/2010 | Gaal et al. | 455/450 |
| 2010/0238888 A1* | 9/2010 | Sampath et al. | 370/329 |
| 2010/0284339 A1* | 11/2010 | Noh et al. | 370/328 |
| 2011/0002270 A1* | 1/2011 | Himayat et al. | 370/328 |
| 2011/0003591 A1* | 1/2011 | Venkatachalam et al. | 455/434 |
| 2011/0007627 A1* | 1/2011 | Lee et al. | 370/210 |
| 2011/0013720 A1* | 1/2011 | Lee et al. | 375/295 |
| 2011/0044259 A1* | 2/2011 | Nimbalker et al. | 370/329 |
| 2011/0058533 A1* | 3/2011 | Yeh et al. | 370/331 |
| 2011/0110325 A1* | 5/2011 | Kalhan | 370/330 |
| 2011/0116480 A1* | 5/2011 | Li et al. | 370/332 |
| 2011/0143762 A1* | 6/2011 | Zhang et al. | 455/450 |
| 2011/0149878 A1* | 6/2011 | Ahmadi et al. | 370/329 |
| 2011/0194529 A1* | 8/2011 | Cho et al. | 370/331 |
| 2011/0237257 A1* | 9/2011 | Soliman et al. | 455/436 |
| 2011/0281574 A1* | 11/2011 | Patel et al. | 455/422.1 |
| 2011/0305180 A1* | 12/2011 | Osterling | 370/311 |
| 2011/0305287 A1* | 12/2011 | Kwon et al. | 375/260 |
| 2012/0178482 A1* | 7/2012 | Seo et al. | 455/501 |
| 2012/0258720 A1* | 10/2012 | Tinnakornsrisuphap et al. | 455/442 |
| 2013/0203424 A1* | 8/2013 | Van Phan et al. | 455/448 |
| 2014/0105124 A1* | 4/2014 | Baldemair et al. | 370/329 |

FOREIGN PATENT DOCUMENTS

| | | |
|---|---|---|
| CN | 101133675 A | 1/2005 |
| WO | WO2006016252 A1 | 8/2004 |
| WO | WO2008038367 A1 | 9/2006 |

OTHER PUBLICATIONS

The SIPO has prepared the Examination Report of the Chinese patent application 201180000975.9 dated Mar. 18, 2013(9 pages).

JPO, Office Action of JP application 2012-546350 dated Aug. 20, 2013 (7 pages).

3GPP TSG RAN WG4#53 Meeting R4-094246; Nokia Siemens Networks, Nokia; Consideration on LTE TDD HeNB Synchronization Requirements; Jeju, Korea, Nov. 9-13, 2009 (6 pages).

3GPP TSG-RAN WG4 #53 R4-094985; Qualcomm Europe, CMCC, Nokia Siemens Networks, Nokia; TDD HeNB Synchronization Requirement for Large Propagation Distance Case; Jeju, Korea, Nov. 9-13, 2009 (5 pages).

3GPP TSG RAN WG1 #48 R1-071007; Nokia; Uplink Timing Control; St Louis, USA, Feb. 12-16, 2007 (2 pages).

IEEE C80216m-09/3007r4; Proposed New Information Contents on the Ranging Channel for Synchronized AMSs in IEEE P802.16m/D3 (Section 16.2.3.29 and Section 16.3.6.5.1.2) dated Dec. 31, 2009 (5 pages).

3GPP TSG-RAN WG4 #52 R4-093142; Qualcomm Europe; Resubmission of Text Proposal for HeNB Timing Requirements; Shenzhen, China, Aug. 24-28, 2009 (5 pages).

3GPP TSG-RAN WG2 Meeting #64bis R2-090532; TD Tech; Discussion on Synchronization Scheme for 1.28Mops TDD Home Node B AP Device.

* cited by examiner

HANDOVER RANGING FOR MS2

METHOD OF TWO-STEP UPLINK
SYNCHRONIZATION FOR PICO/FEMTOCELLS

TWO-STEP UPLINK SYNCHRONIZATION FOR PICO/FEMTOCELL

CROSS REFERENCE TO RELATED APPLICATIONS

This application claims priority under 35 U.S.C. §119 from U.S. Provisional Application No. 61/293,424, entitled "A Two-Step Scheme for Uplink Synchronization in Femtocell," filed on Jan. 8, 2010; the subject matter of which is incorporated herein by reference.

TECHNICAL FIELD

The disclosed embodiments relate generally to wireless network communications, and, more particularly, to uplink synchronization for pico/femtocell in wireless mobile communication systems.

BACKGROUND

Picocell and Femtocell deployment is an important feature in the next generation (4G) wireless mobile communication systems, such as WiMAX 2.0 systems defined by IEEE 802.16m and LTE-Advanced systems defined by 3GPP Release 10. The deployment of pico/femtocell enhances indoor services of wireless mobile communication, off-loads traffic of macro and/or micro base stations, and compensates and reduces outdoor service coverage holes. Network timing synchronization becomes an important issue when pico/femtocells are deployed together with overlaying macro/microcells, especially in a co-channel development scenario. Network timing synchronization has to be kept so that radio signals from a pico/femto base station and an overlaying macro/micro base station over the air do not interfere with each other.

FIG. 1 (Prior Art) illustrates a hierarchical cell structure of macro/microcells and pico/femtocells in a cellular OFDM communication system 10. Cellular OFDM communication system 10 comprises a macro/micro base station BS 11, pico/femto base stations BS 12 and BS 13, and mobile stations MS 14 and MS 15. The two pico/femto base stations BS12 and BS13 have smaller cell coverage, while the overlaying macro/micro base station BS11 has much larger cell coverage. In the example of FIG. 1, BS12 is located close to BS11 while BS13 is located far from BS11. Mobile station MS14 is served by pico/femto BS13, and mobile station MS15 is served by macro/micro BS11. MS15 is located far from its serving BS11 but relatively close to pico/femto BS13.

FIG. 2 (Prior Art) illustrates downlink and uplink subframes and transmission timing in cellular OFDM communication system 10. As illustrated in FIG. 2, in a time division duplex (TDD) system, macro base station BS11 transmits data during downlink (DL) subframes and receives data during uplink (UL) subframes. Each DL subframe is followed by an UL subframe after a predefined transmit transition gap (TTG) time, and each UL subframe is followed by a DL subframe after a predefined receive transition gap (RTG) time. Pico/femto base station BS12 is synchronized with overlaying BS11, and has approximately the same DL and UL transmission timing due to its physical proximity with BS11. Pico/femto base station BS13 is also synchronized with overlaying BS11, but has a delayed DL and UL transmission timing due to DL propagation delay. For mobile station MS15 that is served by BS11, it receives data during DL subframes and transmits data during UL subframes. After DL and UL synchronization with its serving BS11, each DL subframe of MS15 synchronizes with each DL subframe of BS11 with a DL propagation delay, while each UL subframe of MS15 synchronizes with each UL subframe of BS11 with an UL timing advance. Because of the DL propagation delay and the UL timing advance, it can be seen that the UL subframes between pico/femto BS13 and MS15 has a timing difference, as illustrated in FIG. 2.

Therefore, it is necessary for pico/femto BS13 to adjust its TTG to avoid possible uplink interference between a pico/femto mobile station (e.g. MS14) and a nearby macro/micro mobile station (e.g. MS15). Without adjustment of TTG in a pico/femtocell, the uplink receiving of the pico/femto base station may be interfered by uplink transmission of neighboring mobile stations served by an overlaying macro/micro base station due to non-aligned uplink subframes if the timing difference is not an integer number of OFDM symbols. For mobile stations that handover or are camped on in the pico/femtocell, however, they have no knowledge of any TTG adjustment. Without knowing the TTG adjustment value, there will be different understanding about the UL transmission time between mobile stations and the pico/femto BS, which would likely to result in incomplete receiving of uplink signals such as ranging signals at the pico/femto BS.

In current IEEE 802.16m and 3GPP systems, non-synchronized ranging channel (RCH) or random access channel (RACH) is utilized for initial and handover ranging in pico/femtocells. FIG. 3 (Prior Art) illustrates a non-synchronized ranging channel 31 and a data channel 32 in an IEEE 802.16m OFDM system. As illustrated in FIG. 3, a pico/femto MS utilizes non-synchronized ranging channel 31 for ranging preamble transmission, and a macro/micro MS utilizes data channel 32 for data transmission. The non-synchronized ranging channel 31 has a long ranging cyclic prefix (RCP) length and guard time to accommodate the time difference of non-aligned uplink subframes between the pico/femto MS and the macro/micro MS. This solution, however, is associated with a few disadvantages. First, it requires a non-synchronous ranging channel to have a different CP length from a data channel in the same communication system. Second, the different CP lengths between non-synchronous ranging channel and data channel may result in interference with each other. As illustrated in FIG. 3, since the time domain structure of the non-synchronous ranging channel 31 is different from the data channel 32, the orthogonality in frequency domain between the two channels may be destroyed. When the macro/micro MS transmits data channel, and the pico/femto MS transmits ranging channel, ranging performance in pico/femtocell degrades significantly. Third, a non-synchronous ranging channel may have a different physical structure and code sequences than those of a synchronous ranging channel. Thus, without utilizing a unified synchronous ranging channel, hardware complexity and cost of a pico/femto BS may not be reduced.

SUMMARY

A two-step uplink synchronization method is provided for uplink synchronization between a mobile station and a pico/femto base station that is deployed together with an overlaying macro/micro base station. In a first step, the pico/femto BS encodes and broadcasts UL transmission timing advance offset information via a broadcast channel. The MS decodes the received UL transmission timing advance offset information and advances its uplink timing for ranging or reference signal transmission based on the decoded offset value. In a second step, the MS and the pico/femto BS performs regular uplink synchronization and uplink access procedure. By using the two-step uplink synchronization method, a unified synchronous ranging channel may be used for ranging and UL access in pico/femtocells with reduced interference.

In one example, the UL transmission timing advance offset information indicates a round-trip propagation time of radio signals between the pico/femto base station and the overlay macro/micro base station. In one embodiment, the pico/femto BS encodes the UL transmission timing advance offset information into a number that is indicative of an UL transmission timing advance offset value. The MS receives the UL transmission timing advance offset information and decodes the UL transmission timing advance offset value accordingly. In an IEEE 802.16m WiMAX system, it is proposed that the MS advances ranging signal transmission timing based on the decoded offset value before conducting the regular UL synchronization procedure. In a 3GPP LTE/LTE-A system, it is proposed that the MS advances reference signal transmission timing based on the decoded offset value before conducting the regular UL access procedure.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
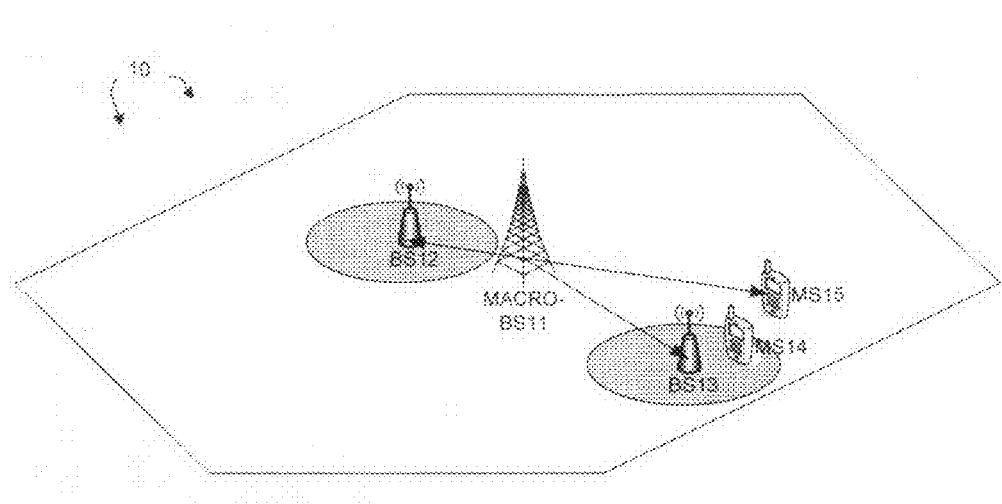
FIG. 1 (Prior Art) illustrates a hierarchical cell structure of macro/microcells and pico/femtocells in a cellular OFDM communication system.
Figure 2:
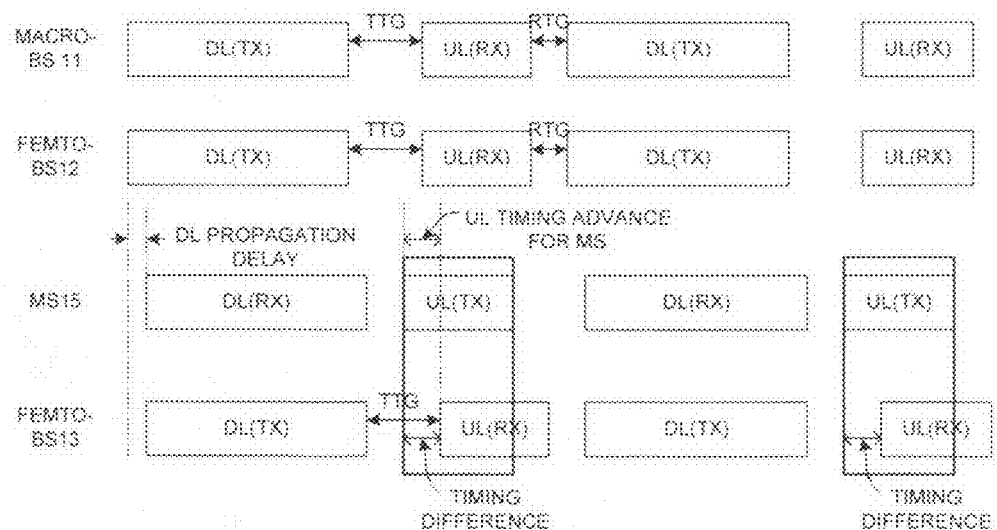
FIG. 2 (Prior Art) illustrates downlink and uplink subframes and transmission timing in a cellular OFDM communication system.
Figure 3:
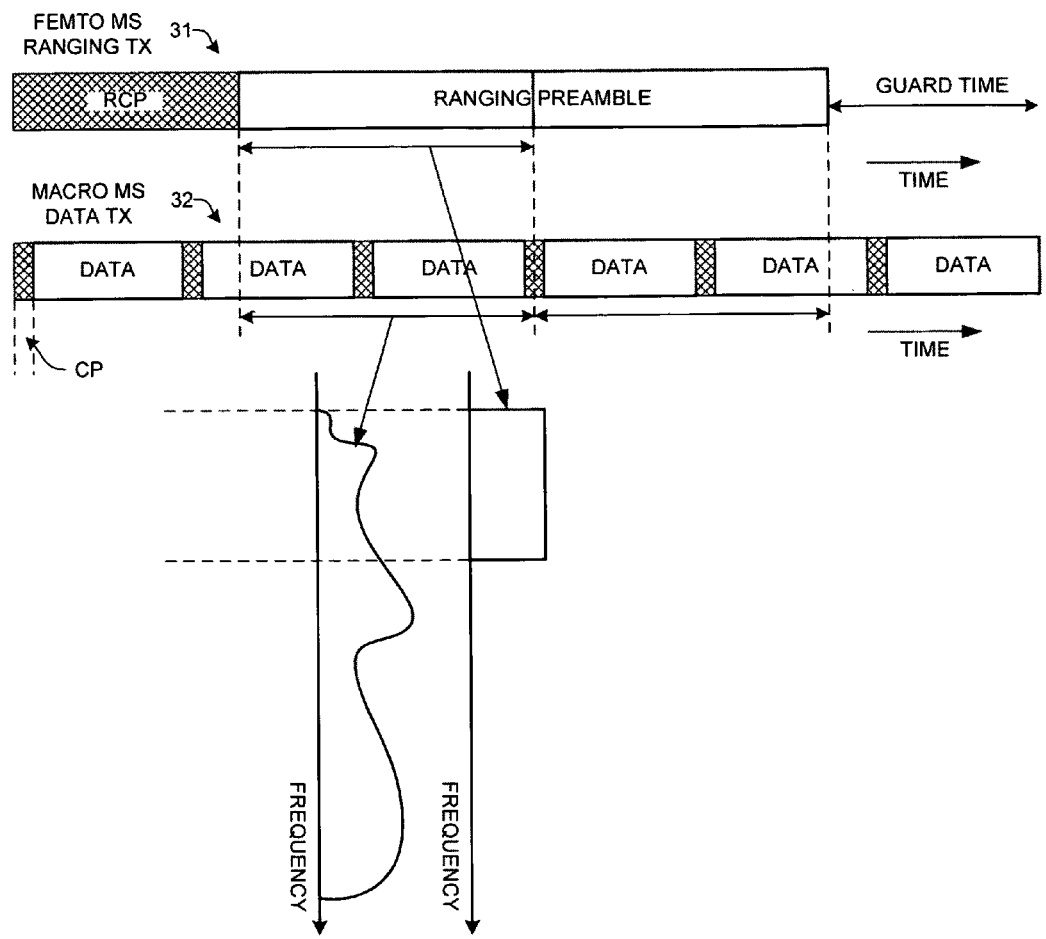
FIG. 3 (Prior Art) illustrates a non-synchronized ranging channel and a data channel in an IEEE 802.16m OFDM system.
Figure 4:
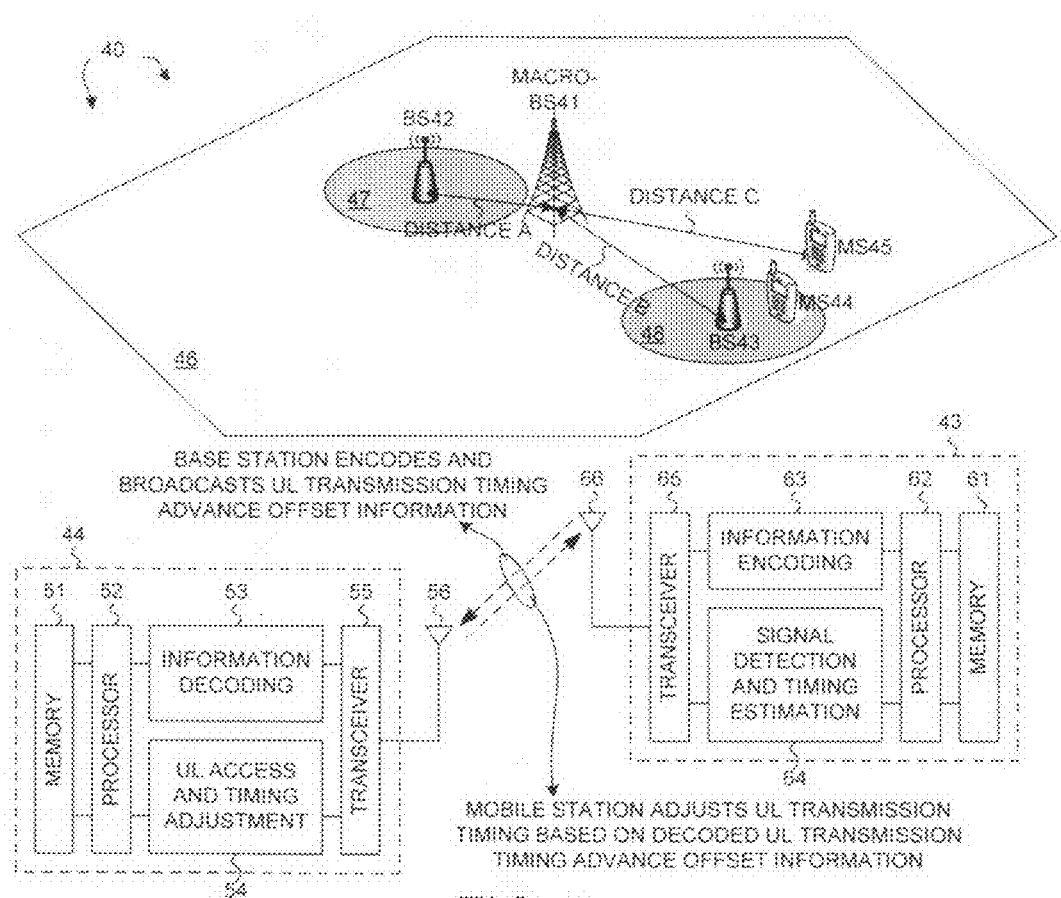
FIG. 4 illustrates a hierarchical cell structure of macro/microcells and pico/femtocells in a cellular OFDM/OFDMA communication system 40 in accordance with one novel aspect.

FIG. 4 illustrates a hierarchical cell structure of macro/microcells and pico/femtocells in a cellular OFDM/OFDMA communication system 40 in accordance with one novel aspect. Cellular OFDM/OFDMA communication system 40 comprises a macro/micro base station BS 41, pico/femto base stations BS 42 and BS 43, and mobile stations MS 44 and MS 45. In general, a pico/femto base station has smaller cell coverage, while a macro/micro base station has much larger cell coverage. In a hierarchical cell structure, a cell with smaller coverage (referred to as an underlying cell) is overlapped (either fully or partially) with a cell with larger coverage (referred to as an overlaying cell). In the example of FIG. 4, macro/micro BS41 is an overlaying BS that provides service for a larger cell 46, while pico/femto BS42 and BS43 are underlying BSs that provide service for much smaller cells 47 and 48. In addition, BS42 is located very close to BS41 with a short distance A, while BS43 is located very far from BS11 with a long distance B. Mobile station MS44 is a pico/femto MS served by pico/femto BS43 and mobile station MS45 is a macro/micro MS served by macro/micro BS41. MS45 is located relatively close to pico/femto BS43, thus is very far from its serving BS41 with a long distance C.

In accordance with one novel aspect, a two-step uplink synchronization procedure is performed between MS44 and BS43. In a first step, BS43 encodes uplink (UL) transmission timing advance offset information and broadcasts the timing advance offset information to MS44. MS44 decodes the UL transmission timing advance offset information and adjusts its UL transmission timing of a ranging or reference signal based on a decoded timing advance offset value. In a second step, MS44 performs regular uplink synchronization and access with BS43. The two-step uplink synchronization procedure enables the use of a ranging or reference signal with normal cyclic prefix (CP) length for uplink synchronization and access, while prevents signals from pico/femto BS43 and overlaying macro/micro BS41 interfere with each other, as illustrated in the background section.

As illustrated in FIG. 4, a mobile station (e.g. MS44) served by a pico/femtocell comprises memory 51, a processor 52, an information decoding module 53, an uplink access and timing adjustment module 54, and a transceiver 55 coupled to an antenna 56. Similarly, a pico/femto base station (e.g., BS43) comprises memory 61, a processor 62, an information encoding module 63, a signal detection and timing estimation module 64, and a transceiver 65 coupled to an antenna 66. In one or more exemplary embodiments, the functions described in the two-step UL synchronization procedure may be implemented in hardware, software, firmware, or any combination thereof by the different modules. The functions described above may be implemented together in a same module, or independently in separate modules. The details of the two-step UL synchronization procedure are now described below with accompanying drawings.

In wireless communication systems, such as defined by IEEE 802.16m specification, base stations and mobile stations communicate with each other by sending and receiving data carried in a series of superframes. Before a mobile station can access a base station, physical (PHY) layer synchronization and Media Access Control (MAC) layer random access are performed. Upon power-on, a mobile station first acquires downlink (DL) synchronization and adjusts its timing, frequency and power via synchronization channel (SCH) broadcasted by a serving base station. After DL synchronization, the mobile station acquires uplink (UL) PHY layer synchronization via ranging procedures and MAC layer random access via network entry procedures with the serving base station. When pico/femtocells are deployed together with macro/microcells in a hierarchical cell structure (e.g. wireless system 40), the DL and UL network timing synchronization has to be kept so that radio signals from a pico/femto BS (e.g. BS43) and an overlaying macro/micro BS (e.g. BS41) over the air do not interfere with each other.

Figure 5:
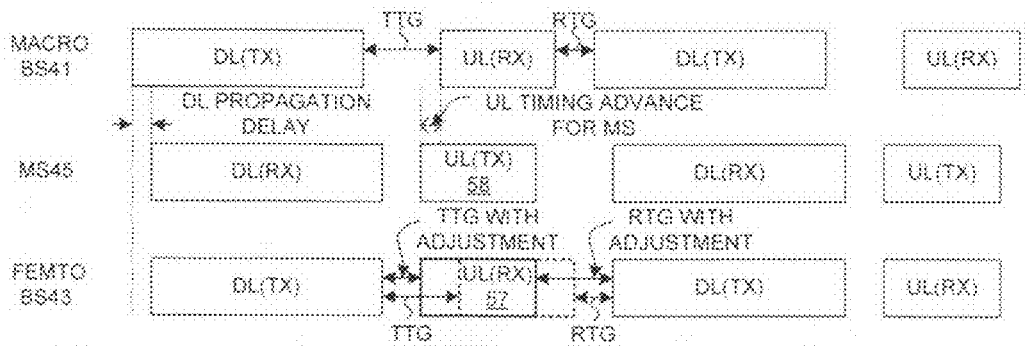
FIG. 5 illustrates downlink and uplink subframes and transmission timing of base stations and mobile stations in a hierarchical cell structure.

FIG. 5 illustrates downlink and uplink subframes and transmission timing in a hierarchical cell structure (e.g., wireless system 40) in accordance with one novel aspect. In a Time Division Duplex (TDD) system, the DL subframe(s) are followed by the UL subframe(s) after a predefined transmit transition gap (TTG) time, and the UL subframe(s) are followed by the DL subframe(s) after a predefined receive transition gap (RTG) time. The TTG and RTG are reserved to avoid possible collision between downlink and uplink transmissions. In the example of FIG. 5, macro/micro base station BS41 transmits data during DL subframes and receives data during UL subframes, while pico/femto mobile station MS45 receives data during DL subframes and transmits data during UL subframes. MS45 is located far from its serving BS41, the propagation time of radio signals between BS41 and MS45 is referred to as a DL propagation delay. After DL and UL synchronization, the DL transmission timing of MS45 is synchronized to BS41 with the DL propagation delay, and the UL transmission timing of MS45 is synchronized to BS41 with an UL timing advance. For UL transmission, the UL timing advance relative to absolute UL timing of BS41 is equal to the DL propagation delay.

For pico/femto base station BS43, because its cell coverage is overlapped with overlaying macro/micro base station BS41, network timing synchronization does not simply mean absolute timing synchronization between BS43 and BS41. In a co-channel deployment scenario where BS43 and BS41 operate in the same frequency band, network timing synchronization means the timing synchronization of radio signals from BS43 and BS41 over the air. More specifically, because BS43 is located far from BS41 and relatively close to MS45, radio signals of mobile stations served by BS43 (e.g., MS44) is likely to interfere with radio signals of nearby mobile stations served by BS41 (e.g. MS45). For DL transmission, the receiving of MS45 from BS41 is likely to be interfered by the nearby BS43 transmitting signals to MS44. On the other hand, for UL transmission, the receiving of BS43 from MS44 is likely to be interfered by the nearby MS45 transmitting signal to BS41. Therefore, network timing synchronization in wireless system 40 means that the DL and UL transmission timing between pico/femto BS43 and its nearby macro/micro MS45 needs to be synchronized with each other to avoid interference.

As illustrated in FIG. 5, in order for BS43 to synchronize with MS45, the pre-defined TTG time and RTG time need to be adjusted. For example, the UL transmission timing of UL(RX) subframe 57 of BS43 (e.g., depicted by a solid line) is determined based on an adjusted TTG time. In general, the TTG adjustment value is equal to the round-trip time of radio signals between BS43 and BS41, such that the uplink receiving in UL(RX) subframe 57 of BS43 is not interfered by the uplink transmission in UL(TX) subframe 58 of neighboring MS45 served by BS41.

On the other hand, if pico/femto BS43 and overlaying macro/micro BS41 operate in different frequency bands, then such TTG adjustment may not be necessary, especially if the different frequency bands are separate from each other. For example, the UL transmission timing of the same UL(RX) subframe 57 of BS43 (e.g., depicted by a dashed line) is determined based on the original pre-defined TTG time, as illustrated in FIG. 5. In such a deployment scenario, it is up to the pico/femto base station to decide whether TTG adjustment is applied.

Therefore, due to downlink and uplink network timing synchronization requirement for a pico/femto base station, the pre-defined TTG reserved to avoid the collision of downlink and uplink transmission may need to be adjusted base on the deployment location of the pico/femto base station. However, for mobile stations which handover to a pico/femto cell or camping on in a pico/femtocell, there is no mechanism for them to know whether TTG adjustment is applied in the pico/femtocell. Without knowing this adjustment value, there will be different understandings about the uplink transmission timing between the mobile stations and the pico/femto BS.

Figure 6:
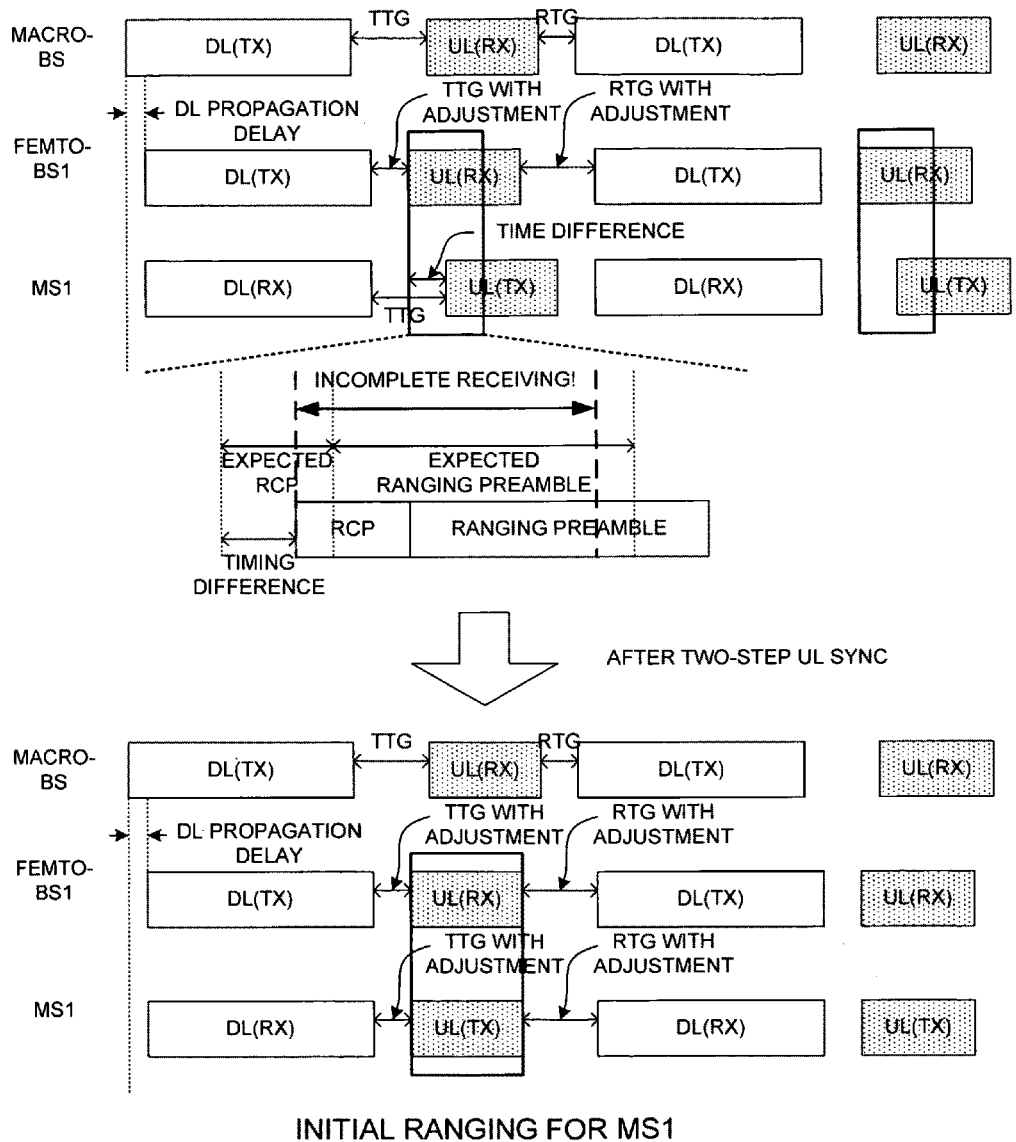
FIG. 6 illustrates downlink and uplink subframes and transmission timing during an initial ranging procedure in a pico/femtocell.

FIG. 6 illustrates downlink and uplink subframes and transmission timing during an initial ranging in a pico/femtocell. In the example of FIG. 6, a femto BS1 is deployed together with an overlay macro BS in a co-channel deployment scenario. For the macro BS, its DL subframes are followed by UL subframes with a predefined TTG, and its UL subframes are followed by DL subframes with a predefined RTG. To prevent signals from femto BS1 and macro BS interfering with each other, femto BS1 applies the predefined TTG with a TTG adjustment value. The TTG adjustment value is equal to the round-trip time of radio signals between femto BS1 and the macro BS. Femto BS1 then adjusts its UL transmission timing for its UL frames based on the adjusted TTG. Suppose that a mobile station MS1 is powered on inside the cell coverage of femto BS1. MS1 does not know that a TTG adjustment value is being applied in the femtocell by femto BS1. Without knowing the TTG adjustment, MS1 applies the same predefined TTG for its UL transmission timing. As a result, the UL transmission timing of MS1 has a time difference as compared to the UL transmission timing of femto BS1. This time difference is equal to the TTG adjustment value.

When MS1 performs initial ranging with femto BS1, such induced time difference results in incomplete receiving of ranging preamble signals at femto BS1 if the length of the ranging channel cyclic prefix (RCP) is less than the time difference. As illustrated in FIG. 6, in accordance with one novel aspect, if femto BS1 informs its TTG adjustment to MS1 before the initial ranging, MS1 is then able to adjust its own UL transmission timing based on the same adjusted TTG value as femto BS1. MS1 and femto BS1 thus can successfully perform ranging followed by UL synchronization procedure.

Figure 7:
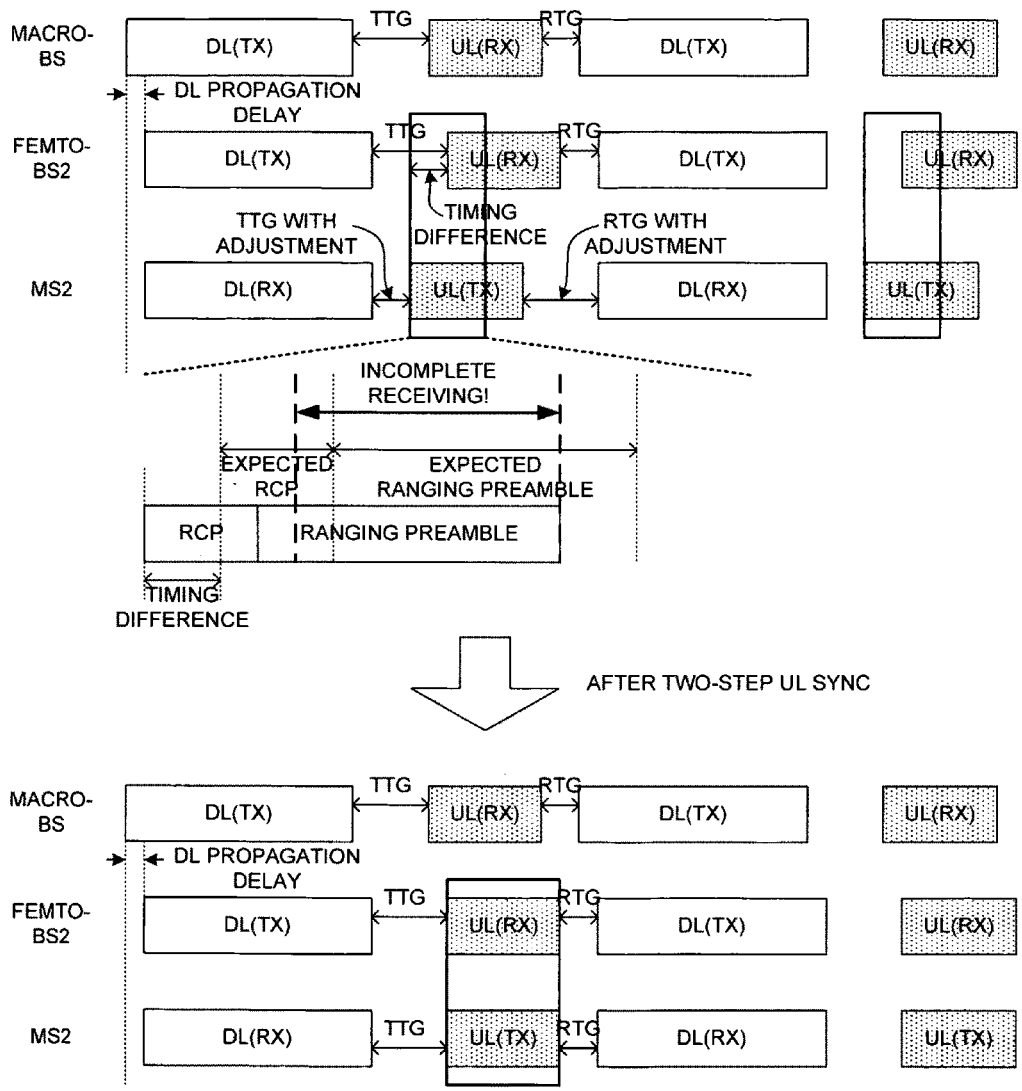
FIG. 7 illustrates downlink and uplink subframes and transmission timing during a handover ranging procedure in a pico/femtocell.

FIG. 7 illustrates downlink and uplink subframes and transmission timing during a handover ranging in a pico/femtocell. In the example of FIG. 7, a femto BS2 is deployed together with an overlay macro BS, but the two BSs operate in separate frequency bands. For the macro BS, its DL subframes are followed by UL subframes with a predefined TTG, and its UL subframes are followed by DL subframes with a predefined RTG. For femto BS2, because it operates in a different frequency band from the overlaying macro BS, it may decide to use the same predefined TTG and RTG for its DL and UL transmission timing without applying any TTG adjustment. Suppose a nearby mobile station MS2 is going to handover from the macro BS to femto BS2. MS2 was originally served by the macro BS and its UL transmission timing was adjusted with a timing advance corresponds to a round-trip time of radio signals between the macro BS and MS2. MS2 does not know that the pre-defined TTG is being applied in the femtocell by femto BS2. As a result, the UL transmission timing of MS2 has a time difference as compared to the UL transmission timing of femto BS2. This time difference is equal to the timing advance applied by MS2 before handover.

When MS2 starts to perform handover ranging with femto BS2, such induced time difference results in incomplete receiving of ranging preamble signals at femto BS2 if the length of the ranging channel cyclic prefix (RCP) is less than the time difference. As illustrated in FIG. 7, in accordance with one novel aspect, if femto BS2 informs its TTG adjustment value to MS2 before the handover ranging, MS2 is then able to adjust its own UL transmission timing based on the same TTG adjustment value as femto BS2. MS2 and femto BS2 thus can successfully perform ranging followed by UL synchronization procedure.

In addition to the problem of incomplete receiving of the ranging preamble signals, the non-aligned uplink transmission of ranging preamble signals also introduces serious interference to other mobile stations served by the femto BS. For example, the receiving of uplink data from other MSs at femto BS1 or femto BS2 would be interfered by the transmission of ranging preamble signals from MS1 or MS2 if the guard time of the ranging channel is less than the time difference.

While the use of a non-synchronous ranging channel with long RCP length and guard time may partially solve the problem of ranging and interference, a unified synchronous ranging channel is still preferred, for several reasons as explained in the background section. To enable the use of a unified synchronous ranging channel, in accordance with one novel aspect, a two-step uplink synchronization procedure is proposed such that a pico/femto BS with overlaying macro/micro BS is able to perform ranging and uplink synchronization successfully without interfering with other mobile stations.

Before describing the details of the two-step UL synchronization procedure, it should be noted that although the above examples were illustrated using TDD systems, the same principle could be applied in frequency division duplex (FDD) systems. In TDD systems, the term "TTG adjustment" is used. In FDD systems, however, a more generic term "transmission timing advance offset" may be used instead. It should be further noted that although the above examples were illustrates using IEEE 802.16m systems, the same principle could be applied in 3GPP systems. In IEEE 802.16m WiMAX systems, a mobile station transmits a ranging signal via a ranging channel (RCH) for UL synchronization. In 3GPP LTE/LTE-A systems, however, a user equipment (UE) transmits a reference signal via a random access channel (RACH) to request for UL access. The term ranging signal or reference signal, and the term ranging channel or random access channel, thus could be used interchangeably with regard to the process of uplink synchronization and access.

Figure 8:
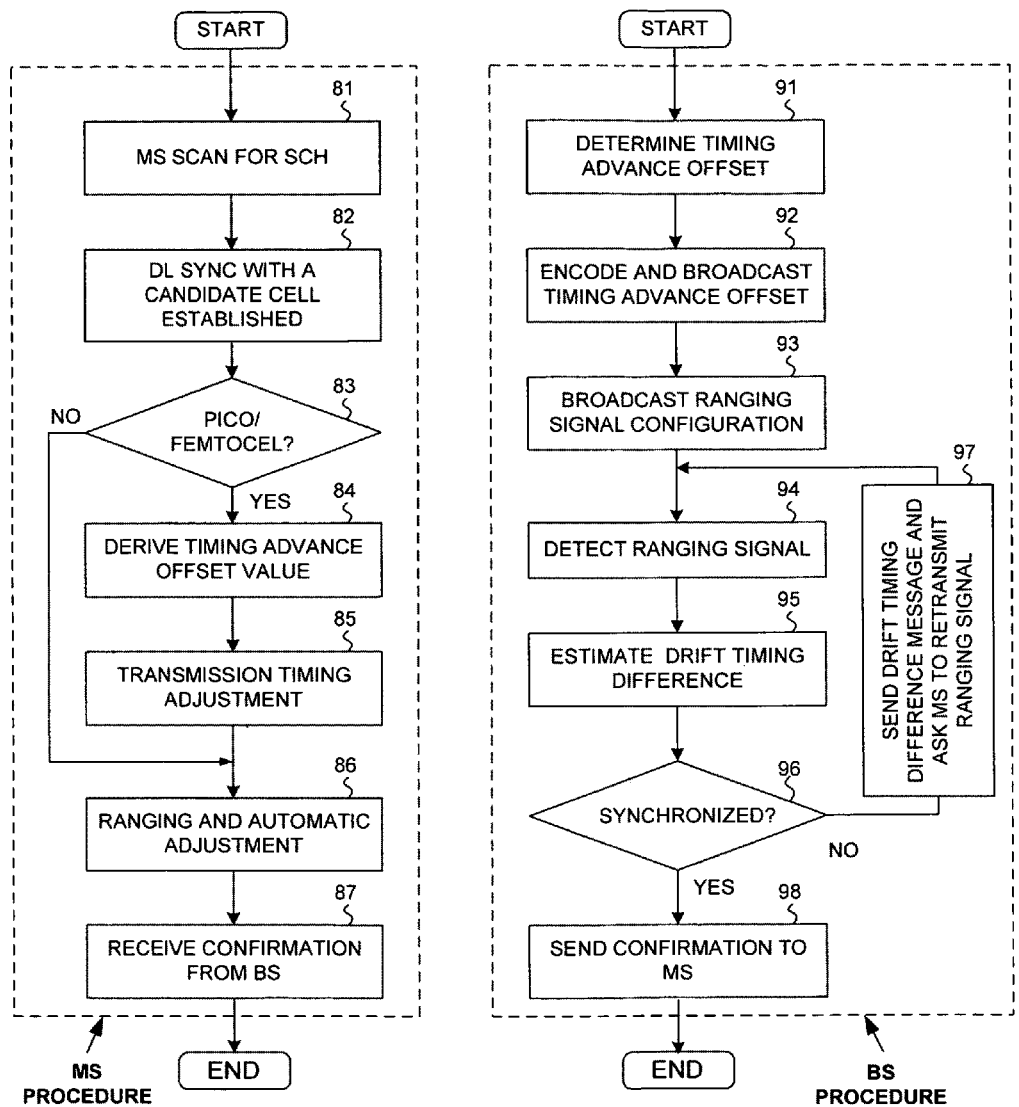
FIG. 8 illustrates a flow chart of a method of two-step uplink synchronization in accordance with one novel aspect.

FIG. 8 illustrates a flow chart of a method of two-step uplink synchronization in accordance with one novel aspect. In the example of FIG. 8, the two-step UL synchronization procedure is performed between a mobile station and a pico/femto base station that is deployed together with an overlay macro/micro base station in an IEEE 802.16m system. At the MS side, the MS first scans synchronization channel (SCH) preambles transmitted by neighboring base stations (step 81). The MS then establishes DL synchronization with a candidate cell (e.g., the pico/femtocell) in step 82. During DL synchronization, the MS obtains and acquires Primary superframe header (P-SFH) and Secondary SFH (S-SFH) information. In step 83, the MS determines whether the candidate cell belongs to a cell type of picocell or femtocell. If the answer is yes, then the MS obtains UL transmission timing advance offset information from SFH, and derives an UL transmission timing advance offset value from the offset information (step 84). The MS then advances its UL transmission timing for transmitting ranging signals based on the derived timing advance offset value (step 85). After UL transmission timing adjustment, the MS starts performing regular ranging and automatic adjustment with the pico/femto BS in step 86. On the other hand, if the answer is no, then the MS starts to perform regular ranging and automatic adjustment and establishes UL synchronization with the pico/femto BS directly (step 86). During the regular ranging process, the MS encodes and transmits a ranging signal, receives and decodes a drift timing difference message sent from the pico/femto BS, automatically adjusts UL transmission timing based on the decoded drift timing difference, and re-transmits the ranging signal with the adjusted UL transmission timing. Finally, in step 87, the MS receives a confirmation from the pico/femto BS and the uplink synchronization is completed.

At the pico/femto BS side, the pico/femto BS first determines an UL transmission timing advance offset value (e.g., a TTG adjustment value in TDD system) in step 91. The pico/femto BS then encodes the timing advance offset value into UL transmission timing advance offset information and broadcasts the offset information via a broadcast channel (BCH) in step 92. In step 93, the pico/femto BS broadcasts ranging signal configuration to the MS. In step 94, the pico/femto BS detects a ranging signal sent from the MS, the ranging signal is transmitted with an advanced UL transmission timing based on the broadcasted offset information. In step 95, the pico/femto BS estimates the drift timing difference from the detected ranging signal. In step 96, the pico/femto BS determines whether uplink timing is synchronized. If the answer is yes, then the pico/femto BS sends confirmation to the MS and the uplink synchronization is completed (step 98). On the other hand, if the answer is no, then the pico/femto BS sends a drift timing difference message to the MS and asks the MS to re-transmit the ranging signal (step 97). The pico/femto BS goes back to step 94 and repeats steps 94-97 until uplink timing is synchronized.

Although the UL transmission timing advance offset information illustrated above is broadcasted by the pico/femto base station, such information may also be sent by the overlaying macro/micro base station. When UE performs neighboring cell measurements and reports the measurement results back to serving base station, the serving base station determines the handover target and then send UE handover command along with some configuration information via dedicated signaling, where the UL transmission timing advance offset is included. In 3GPP specification, the dedicated signaling is done by radio resource control (RRC) messages. In IEEE 802.16 specification, the dedicated signaling is done by MAC management messages.

In one embodiment, the UL transmission timing advance offset information comprises an encoded number that is indicative of the UL transmission timing advance offset value (e.g., the round trip delay time from the pico/femto BS to the overlay macro/micro BS). Suppose a total number of k bits are used to signal the offset value, $N_{RTO}$ is a parameter provided at the pico/femto BS side that is used for the calculation of a sample number $T_{RTO}$, and $T_{RTO}$ is a parameter applied at the MS side to advance the ranging signal transmission timing when the MS performs initial ranging or handover ranging in the pico/femtocell. Mathematically, $N_{RTO}$ and $T_{RTO}$ can be represented by the following equations:

$$N_{RTO} = \min([RTD/(Tg-2)], 2^k-1)$$

$$T_{RTO} = [N_{RTO}*(Tg-2)*Fs] \text{(samples)}$$

where RTD (μs) is the round trip delay from the pico/femto BS to the overlay macro/micro BS, Tg (μs) is the guard time, and Fs (MHz) is the sampling frequency at the MS side. The range of values is $0 <= N_{RTO} <= (2^k-1)$. Under this encoding method, at the pico/femto BS side, the round trip delay RTD is represented by a total number of $N_{RTO}$ time units, and each time unit is equal to (Tg−2) μs. The number $N_{RTO}$ is then sent by the pico/femto BS to the MS via a broadcast channel. At the MS side, the MS obtains $N_{RTO}$ from the broadcasted system information (SFH in IEEE 802.16m system), and then calculates a corresponding $T_{RTO}$ and the timing advance offset value accordingly. In other words, the UL transmission timing advance offset value is approximate to RTD, which is equal to $N_{RTO}*(Tg-2)$ μs, and the largest cell size this signaling method can cover is $((2^k-1)/2)*(Tg-2)*10^{-6}*c$, where c is the speed of radio signals. For example, if k=3 and Tg=91.4/8 μs, then the largest cell size this method can cover is equal to $((2^k-1)/2)*(Tg-2)*c=(7/2)*(91.4/8-2)*(10^{-6})*(3*10^8)\approx9.9$ km.

Although the present invention has been described in connection with certain specific embodiments for instructional purposes, the present invention is not limited thereto. For example, while the main application of the two-step UL synchronization method is for OFDM/OFDMA systems, this method may also be applied in other systems such as macro/micro (TD-SCDMA) vs. pico/femto (3GPP LTE/LTE-A) or other system combinations with the same problem described in the background section. In addition, although the UL transmission timing advance offset information is broadcasted by the pico/femto base station, such information may also be sent by the overlaying macro/micro base station or other centralized network element via dedicated signaling or broadcast signaling. Accordingly, various modifications, adaptations, and combinations of various features of the described embodiments can be practiced without departing from the scope of the invention as set forth in the claims.

What is claimed is:

1. A method comprising:
    scanning, by the mobile station, synchronization channel preambles transmitted by neighboring base stations, wherein the neighboring base stations comprise a first femto/pico base station, and a second, macro base station, where the second base station's cell overlaps the first base station's cell;
    establishing downlink synchronization with the first base station;
    determining, by the mobile station, whether the neighboring base station is a femto/pico base station or macro base station, wherein, when the neighboring base station is a femto/pico base station deriving uplink (UL) transmission timing advance offset information via system information broadcast, and wherein the timing advance offset information is determined based on at least frequency bands of the first base station and the second base station;
    adjusting an UL transmission timing based on the received UL transmission timing advance offset information for the first base station, wherein the UL transmission timing advance offset information indicates a round-trip propagation time of radio signals between the first base station and the second base station;
    sending ranging signal or reference signal for initial access or handover to the first femto/pico base station using the adjusted UL transmission timing via a unified synchronous ranging channel wherein a normal cyclic prefix (CP) length that equals to a CP length of a data channel is used; and
    performing UL synchronization and UL access with the first base station.

2. The method of claim 1, wherein the UL transmission timing is advanced for ranging signal transmission via a ranging channel (RCH) having a cyclic prefix (CP) length that is equal to a CP length of a data channel.

3. The method of claim 1, wherein the UL transmission timing is advanced for reference signal transmission via a random access channel (RACH) having a cyclic prefix (CP) length that is equal to a CP length of a data channel.

4. The method of claim 1, wherein the UL transmission timing advance offset information comprises an encoded number indicative of an UL transmission timing advance offset value.

5. The method of claim 1, wherein the mobile station decodes the UL transmission timing advance offset information broadcasted by the base station via a broadcast channel (BCH).

6. mobile station, comprising:
    a transceiver that (a) scans synchronization channel preambles transmitted by neighboring base stations, wherein the neighboring base stations comprise a first femto/pico base station, and a second, macro base station, where the second base station's cell overlaps the first base station's cell, (b) establishes downlink synchronization with the first base station, and (c) receives uplink (UL) transmission timing advance offset information via system information broadcasted;
    an information decoding module that determines whether the neighboring base station is a femto/pico base station or macro base station, wherein, when the neighboring base station is a femto/pico base station decodes the UL transmission timing advance offset information and derives an UL transmission timing advance offset value, wherein the timing advance offset information is determined based on at least frequency bands of the first base station and the second base station indicating a round-trip propagation time of radio signals between the first base station and the second base station, wherein UL transmission timing is adjusted based on the offset value for ranging signal reference signal transmission for initial access or handover via a unified synchronous ranging channel, wherein a normal cyclic prefix (CP) length that equals to a CP length of a data channel is used; and
    an UL access and timing adjustment module that performs UL synchronization and UL access with the first base station.

7. The mobile station of claim 6, wherein the UL transmission timing for ranging signal transmission via a ranging channel (RCH) is advanced based on the offset value, and wherein the RCH has a cyclic prefix (CP) length that is equal to a CP length of a data channel.

8. The mobile station of claim 6, wherein the UL transmission timing for reference signal transmission via a random access channel (RACH) is advanced based on the offset value, and wherein the RACH has a cyclic prefix (CP) length that is equal to a CP length of a data channel.

9. The mobile station of claim 6, wherein the UL transmission timing advance offset information comprises an encoded number indicative of an UL transmission timing advance offset value.

10. The mobile station of claim 6, wherein the information decoding module decodes the UL transmission timing advance offset information broadcasted by the base station via a broadcast channel (BCH).

11. A method, performed at a femto/pico base station, comprising:
    determining an uplink (UL) transmission timing advance offset value by the femto/pico base station in a cellular communication system, wherein the base station has a different cell coverage overlapped with a cell coverage of a macro base station, and wherein the timing advance offset information is determined based on at least frequency bands of the femto/pico base station and the macro base station;
    encoding the UL transmission timing advance offset value into UL transmission timing advance offset information and broadcasting the information via a broadcast channel, wherein the UL transmission timing advance offset value is equal to a round trip propagation time of radio signals between the femto/pico base station and the macro base station;

detecting an uplink signal from a mobile station, wherein the uplink signal is transmitted with an adjusted transmission timing based on the UL transmission timing advance offset information in an initial uplink transmission via a unified synchronous ranging channel, wherein a normal cyclic prefix (CP) length that equals to a CP length of a data channel is used;

estimating a drift timing difference based on the initial uplink signal; and determining, based on the drift timing difference, whether the mobile station is synchronized with the femto/pico base station, wherein, when the mobile station and femto/pico base station are not synchronized, transmitting a drift timing difference message to the mobile station for subsequent uplink ranging signal transmission.

12. The method of claim 11, wherein the base station adjusts UL transmission timing based on the UL transmission timing advance offset when the base station and the overlay base station operate either in the same frequency band or in nearby frequency bands.

13. The method of claim 11, wherein the base station either uses a predefined value for UL transmission timing or adjusts UL transmission timing based on the UL transmission timing advance offset when the base station and the overlay base station operate in separate frequency bands.

14. The method of claim 11, wherein the initial uplink signal is a ranging signal transmitted via a ranging channel (RCH) having a cyclic prefix (CP) length that is equal to a CP length of a data channel.

15. The method of claim 11, wherein the initial uplink signal is a reference signal transmitted via a random access channel (RACH) having a cyclic prefix (CP) length that is equal to a CP length of a data channel.

16. The method of claim 11, wherein the UL transmission timing advance offset information comprises an encoded number indicative of the UL transmission timing advance offset value.

17. A femto/pico base station, comprising:

an information encoding module that encodes an uplink (UL) transmission timing advance offset value into UL transmission timing advance offset information, wherein the femto/pico base station has a different cell coverage overlapped with a cell coverage of an macro base station, and wherein the timing advance offset information is determined based on at least frequency bands of the femto/pico base station and the macro base station;

a transceiver that broadcasts the UL transmission timing advance offset information via a broadcast channel in a cellular communication system, wherein the UL transmission timing advance offset value is equal to a round trip propagation time of radio signals between the femto/pico base station and the macro base station; and a signal detection and timing estimation module that detects an uplink signal from a mobile station, estimates a drift timing difference and determines, based on the drifting timing difference, whether the mobile station is synchronized with the femto/pico base station, wherein the uplink signal is transmitted with an adjusted transmission timing based on the UL transmission timing advance offset information in an initial uplink transmission via a unified synchronous ranging channel, and wherein a normal cyclic prefix (CP) length that equals to a CP length of a data channel is used, and wherein when the mobile station and femto/pico base station are not synchronized the femto/pico base station transmits a drift timing difference message to the mobile station for subsequent uplink ranging signal transmission.

18. The base station of claim 17, wherein the base station adjusts UL transmission timing based on the UL transmission timing advance offset when the base station and the overlay base station operate either in the same frequency band or in nearby frequency bands.

19. The base station of claim 17, wherein the base station either uses a predefined value for UL transmission timing or adjusts UL transmission timing based on the UL transmission timing advance offset when the base station and the overlay base station operate in separate frequency bands.

20. (The base station of claim 17, wherein the initial uplink signal is a ranging signal transmitted via a ranging channel (RCH) having a cyclic prefix (CP) length that is equal to a CP length of a data channel.

21. The base station of claim 17, wherein the initial uplink signal is a reference signal transmitted via a random access channel (RACH) having a cyclic prefix (CP) length that is equal to a CP length of a data channel.

22. The base station of claim 17, wherein the UL transmission timing advance offset information comprises an encoded number indicative of the UL transmission timing advance offset value.

* * * * *

UNITED STATES PATENT AND TRADEMARK OFFICE
CERTIFICATE OF CORRECTION

| | | |
|---|---|---|
| PATENT NO. | : 8,855,044 B2 | Page 1 of 1 |
| APPLICATION NO. | : 12/930453 | |
| DATED | : October 7, 2014 | |
| INVENTOR(S) | : Liao et al. | |

It is certified that error appears in the above-identified patent and that said Letters Patent is hereby corrected as shown below:

IN THE CLAIMS:

Column 10, line 9, the letter -- A -- should be inserted after -- 6. --.

The text of column 10, line 9 should now read:

6. A mobile station, comprising:

Signed and Sealed this
Twenty-seventh Day of January, 2015

Michelle K. Lee
*Deputy Director of the United States Patent and Trademark Office*